(12) United States Patent
Yalovsky et al.

(10) Patent No.: US 7,519,579 B2
(45) Date of Patent: Apr. 14, 2009

(54) METHOD AND SYSTEM FOR UPDATING A SUMMARY PAGE OF A DOCUMENT

(75) Inventors: Mark Yalovsky, Seattle, WA (US); Christopher H. Pratley, Seattle, WA (US); Julie L. Zhuo, Sugar Land, TX (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 11/018,556

(22) Filed: Dec. 20, 2004

(65) Prior Publication Data

US 2006/0136387 A1 Jun. 22, 2006

(51) Int. Cl.
G06F 17/30 (2006.01)
G06F 7/00 (2006.01)
(52) U.S. Cl. .......................................... 707/3; 707/101
(58) Field of Classification Search ..................... 707/3, 707/102, 101
See application file for complete search history.

(56) References Cited

U.S. PATENT DOCUMENTS

| | | | |
|---|---|---|---|
| 7,076,463 B1 * | 7/2006 | Boies et al. | 705/39 |
| 2003/0014441 A1 * | 1/2003 | Suzuki et al. | 707/513 |
| 2004/0215626 A1 * | 10/2004 | Colossi et al. | 707/100 |
| 2005/0091180 A1 * | 4/2005 | Peleg et al. | 707/1 |
| 2006/0080405 A1 * | 4/2006 | Gibson | 709/218 |
| 2008/0091704 A1 * | 4/2008 | Yennie | 707/102 |

* cited by examiner

Primary Examiner—Angela M Lie
(74) Attorney, Agent, or Firm—Merchant & Gould; Ryan T. Grace

(57) ABSTRACT

A summary page provides a current overview of a document. A query may be created or selected to search for a particular type of data in the document. Metadata associated with the document is analyzed to locate the type of data identified in the query. The query result is displayed on the summary page. A user may scan the summary page to determine an overview of the document based on the query result. The summary page may also include a link to the source of the query result in the document. The query or the query results may be stored in a dynamic content container associated with the document. The dynamic quality of the content container causes the summary page to be continuously updated and synchronous with a current state of the document. Thus, modifications to sources of the query result in the document are dynamically updated on the summary page.

15 Claims, 4 Drawing Sheets

METHOD AND SYSTEM FOR UPDATING A SUMMARY PAGE OF A DOCUMENT

BACKGROUND OF THE INVENTION

Locating specific material within a large text document can be a slow process. Information sought by a user may exist in many different places within the document. The user may locate information in the document by manually scanning each page, conducting a key word search, or analyzing metadata to identify specific objects in the document. Specific information about a document can be accessed from a summary sheet associated with the document. When modifications are made to the document, the summary sheet no longer provides an accurate overview of the document contents.

SUMMARY OF THE INVENTION

A summary page provides a current overview of a text file document. A query may be created or selected to search for a particular type of data in the document. The types of data may include a section heading, contact information, an updated object, meeting notes, an action item, a hyperlink, customer information, a name, a phone number, an e-mail address, a note flag, or any other indicator of the content type associated with text in the document. Metadata associated with the document is analyzed to locate the type of data identified in the query.

The query result is displayed on the summary page. In one example, a query result identifies all instances of a key word within the document. In another example, a query result generates a table of contents for the document. Thus, a user may scan the summary page to determine an overview of the document based on the query result.

The summary page may also include a link to the source of the query result in the document. A user may select the link and navigate the document to the location of the source of the query result. Contextual information associated with the query result may also be displayed on the summary page.

The query or the query results may be stored in a dynamic content container associated with the document. The dynamic quality of the content container causes the summary page to be continuously updated and synchronous with the current state of the document. Thus, modifications to sources of the query result in the document are dynamically updated on the summary page.

In one embodiment, a request is received to query a document for information. The information is identified. The identified information is displayed on the summary page. The summary page is updated when the identified information is modified in the document. The updated summary page is synchronous with a current state of the document.

In another embodiment, the information is identified by analyzing metadata associated with the document. The identified information is stored in a dynamic content container associated with the document. Modifications to the identified information are determined from the dynamic content container.

DETAILED DESCRIPTION OF THE PREFERRED EMBODIMENT

A summary page provides a current overview of a document. A query may be created or selected to search for a particular type of data in the document. Metadata associated with the document is analyzed to locate the type of data identified in the query. The query result is displayed on the summary page. A user may scan the summary page to determine an overview of the document based on the query result. The summary page may also include a link to the source of the query result in the document. The query or the query results may be stored in a dynamic content container associated with the document. The dynamic quality of the content container causes the summary page to be continuously updated and synchronous with a current state of the document. Thus, modifications to sources of the query result in the document are dynamically updated on the summary page.

Illustrative Operating Environment

Figure 1:
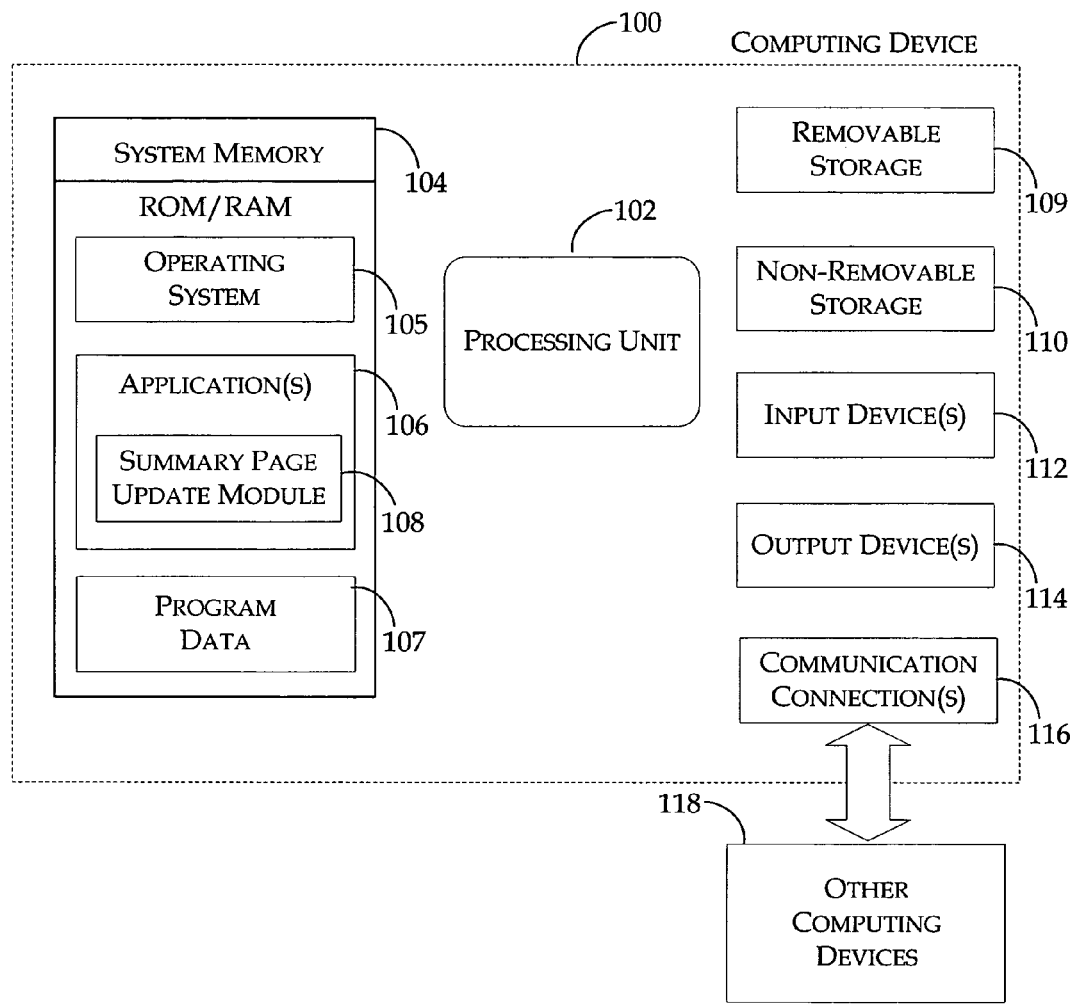
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A summary page update module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Updating a Summary Page of a Document

Figure 2:
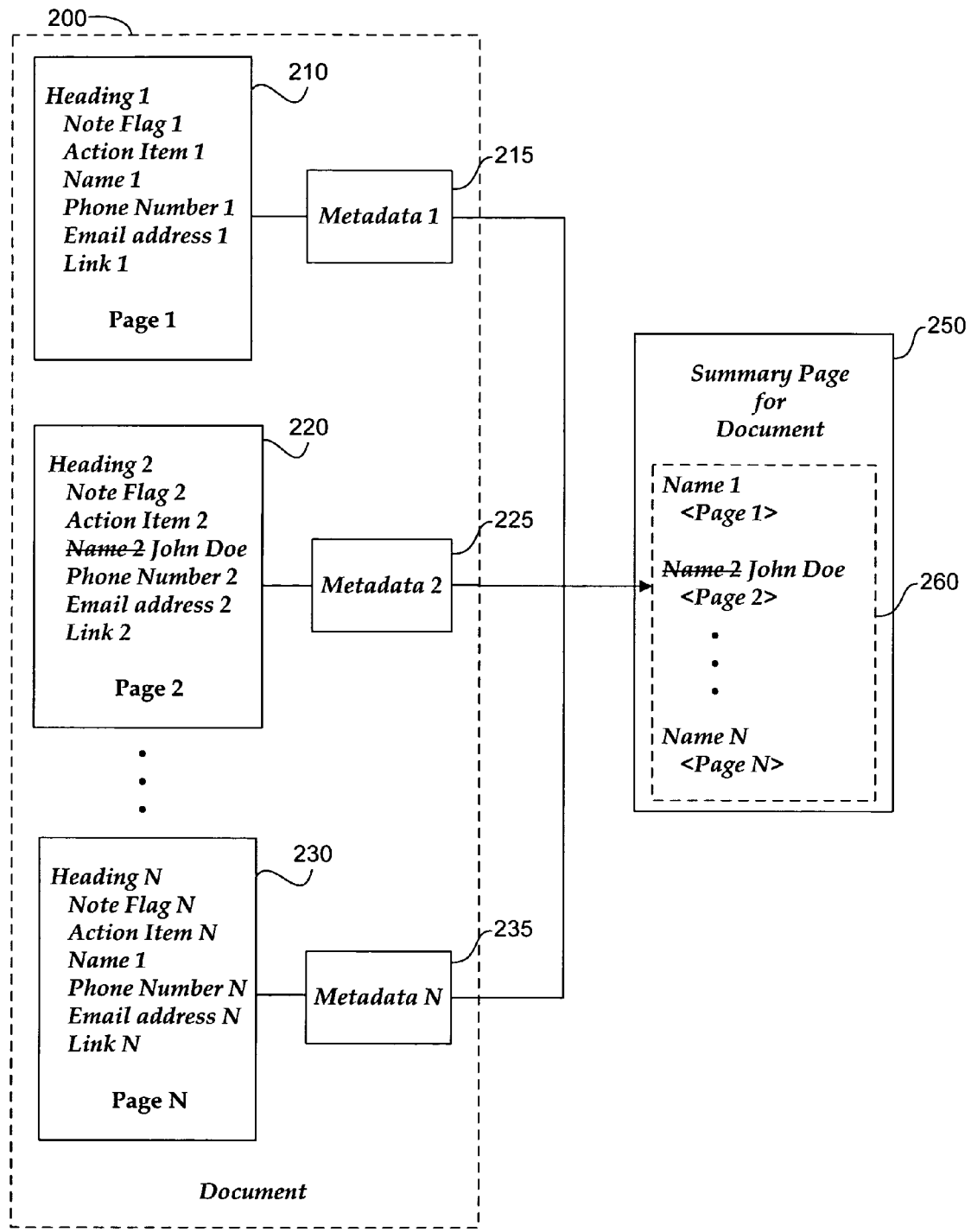
FIG. 2 illustrates a block diagram of a system for updating a summary page associated with a document, in accordance with the present invention.

FIG. 2 illustrates a block diagram of a system for creating and updating a summary page associated with a document. The system includes document 200 and summary page 250 loaded in memory of a computing device. Document 200 may be any text file such as a word processing document or a notebook document. Document 200 includes pages 210, 220, 230. Document 200 is associated with metadata 215, 225, 235. Metadata 215, 225, 235 may be embedded within the same file as document 200. Alternatively, metadata 215, 225, 235 may be stored in a location external to document 200.

Pages 210, 220, 230 may include many different types of data. For example, the types of data may include section headings, note flags, action items, contact information (e.g., name, phone number, e-mail address, residence address), and hyperlinks. The different types of data may be identified by metadata 215, 225, 235. Metadata 215, 225, 235 may describe how, when, and by whom a particular set of data was collected, and how the data is formatted. Pages 210, 220, 230 may also include data that is identified by a pattern (e.g., a telephone number, a customer ID).

Summary page 250 provides an overview of particular types of information included within document 200, or within a subset of pages or sections of document 200. A query to identify a particular type of information in document 200 is generated or selected from a pre-defined query list. The pre-defined query list allows a user to generate a summary page for commonly performed queries. A query may be based on a keyword search, contact information, a type of note flag, or any other information that the user desires to have summarized in summary page 250. In one embodiment, a user may customize a query. For example, a user may define a query to build a list of content that references a particular set of data. The set of data may be dynamic such that the query result may change over time.

Metadata 215, 225, 235 associated with document 200 is analyzed to locate the type of information identified in the query. Query result 260 is displayed on summary page 250. In one embodiment, summary page 250 may provide an overview of document 200 based on a combination of multiple queries. In another embodiment, more than one summary page may be associated with document 200. In yet another embodiment, summary page 250 is automatically generated.

The query or the query result may be stored in a dynamic content container associated with document 200. Dynamic content may be richly formatted content such as hypertext markup language (HTML) content that is generated at run time by a server-side technology. Dynamic content includes any HTML in the resulting document, including client-side scripting, headers, style sheets, extensible markup language (XML), object tags, and the like.

The dynamic content container may be created when a user generates a query or selects an existing query. The query may then be saved to a page associated with document 200. The dynamic quality of the content causes summary page 250 to be continuously and synchronously updated to reflect the current state of document 200. Thus, modifications to the sources of query result 260 in document 200 are automatically displayed on summary page 250. For example, Name 2 on Page 2 of document 200 may be changed to "John Doe." Summary page 250 is then automatically refreshed such that Name 2 is removed from summary page 250 and replaced with "John Doe."

In one embodiment, the user may create or select a query to identify a specific type of data from document 200. For example, as shown in the diagram, the query may identify all names in document 200. Metadata 215, 225, 235 is analyzed to locate all of the names that exist in document 200. The query result is displayed in summary page 250 such that the user is presented with all of the names included within document 200 (e.g., Name 1, Name 2, Name N). Summary page 250 may also include a link to the location where each name is found within document 200 (e.g., Page 1, Page 2, Page N). The user may navigate document 200 from summary page 250 by selecting the link. The user is then taken to the source of the query result in document 200. For example, if the user clicks on either "Name 2" or "Page 2" on summary page 250, the user is navigated to the location of Name 2 on Page 2 of document 200.

In another embodiment, the user may generate a query based on a key word. All instances of the key word within document 200 are identified and displayed on summary page 250. For example, a user may seek an overview of information related to a widget. The user may generate a query such that summary page 250 displays every instance of "widget" within document 200. Contextual information associated with "widget" may also be provided. The contextual information may include the heading of the section that includes "widget", the sentence that includes "widget", a link to the location where a specific instance of "widget" is located within document 200, the creation time associated with content that includes "widget", the modification time associated with content that includes "widget", an identifier that indicates whether a user has viewed the content that includes "widget", and any other data associated with the query result that the user may desire.

In another embodiment, the user may generate a query based on a data pattern. For example, a query may locate every phone number or customer ID number within a document and present the information on summary page 250.

In another embodiment, a user may customize a query to locate content that references a particular data set. For example, a user may define a group entitled "My Projects." The group may include a set of several user projects. The query builds a list of all content in document 200 that references anything in the set. The set may be dynamic such that the definition of the set changes over time or depending on the results of the query. Thus, summary page 250 may display different query results depending on the changed data set.

In yet another embodiment, a user may generate or select a query to display an action item list on summary page 250. The action item list includes tasks that may be located in different areas of document 200. The different tasks may be identified by note flag metadata. A note flag is used to label information in a document. For example, note flags may identify tasks as unperformed, incomplete, or unable to perform until a later date. The note flags may also identify the priority of the tasks. The tasks in the action item list may then be presented on summary page 250 in a particular order (e.g., highest to lowest priority, ease of completion). The user may access summary page 250 to rearrange the order of the tasks, identify accomplished or irrelevant tasks, or add more tasks to the action item list.

A user may perform a query for other types of information in document 200. For example, summary page 250 may display a query result for content that has been updated since the last time the user viewed document 200. Summary page 250 may include information about a shared document such that a user may discern which other users have viewed and/or modified the document. Summary page 250 may also identify pages that have not yet been viewed by the user.

Figure 3:
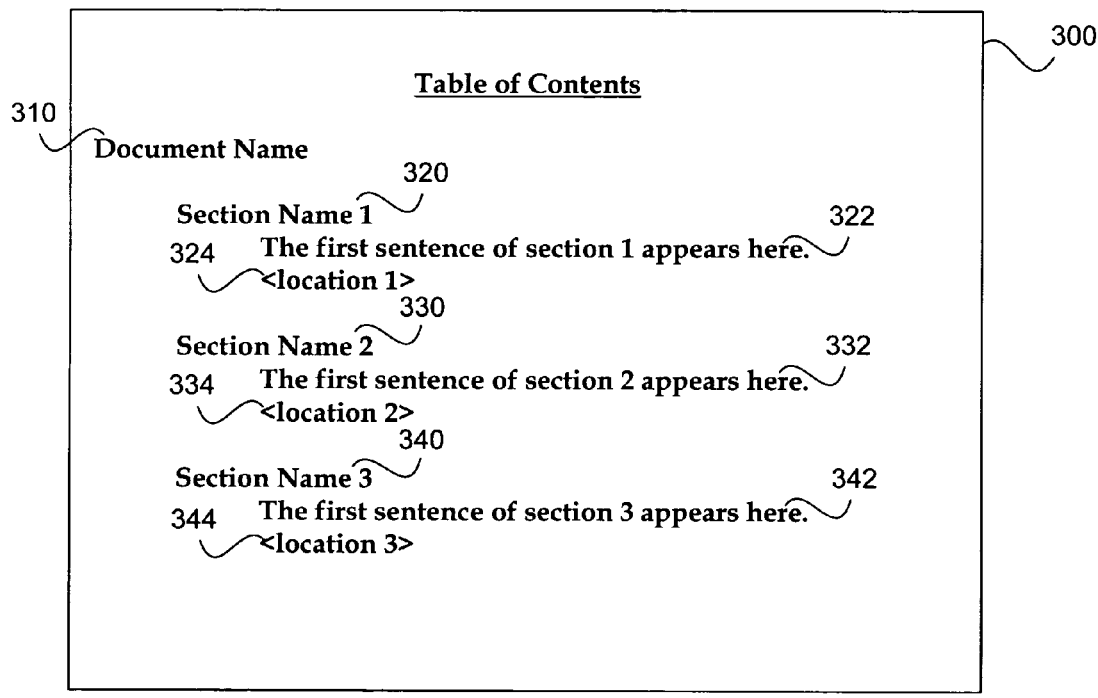
FIG. 3 illustrates an example summary page that displays a table of contents for a document, in accordance with the present invention.

FIG. 3 illustrates an example summary page that displays a table of contents for a document. A user may create or select a query to generate a table of contents. The query may be customized such that the table of contents includes any information associated with a document. For example, the query used to create summary page 300 produces results identifying the document name 310, section names 320, 330, 340, the first sentence 322, 332, 342 (or paragraph) appearing in the section, and corresponding links 324, 334, 344 to the sections. The user may also select how the results are displayed and formatted on summary page 300. Thus, the user may quickly determine the content of a document from summary page 300. The user may also quickly navigate the document from summary page 300 by selecting a particular link 324, 334, 344. Changes made to the document may be reflected on summary page 300. For example, a modified section name in the document would also be changed in the table of contents.

Figure 4:
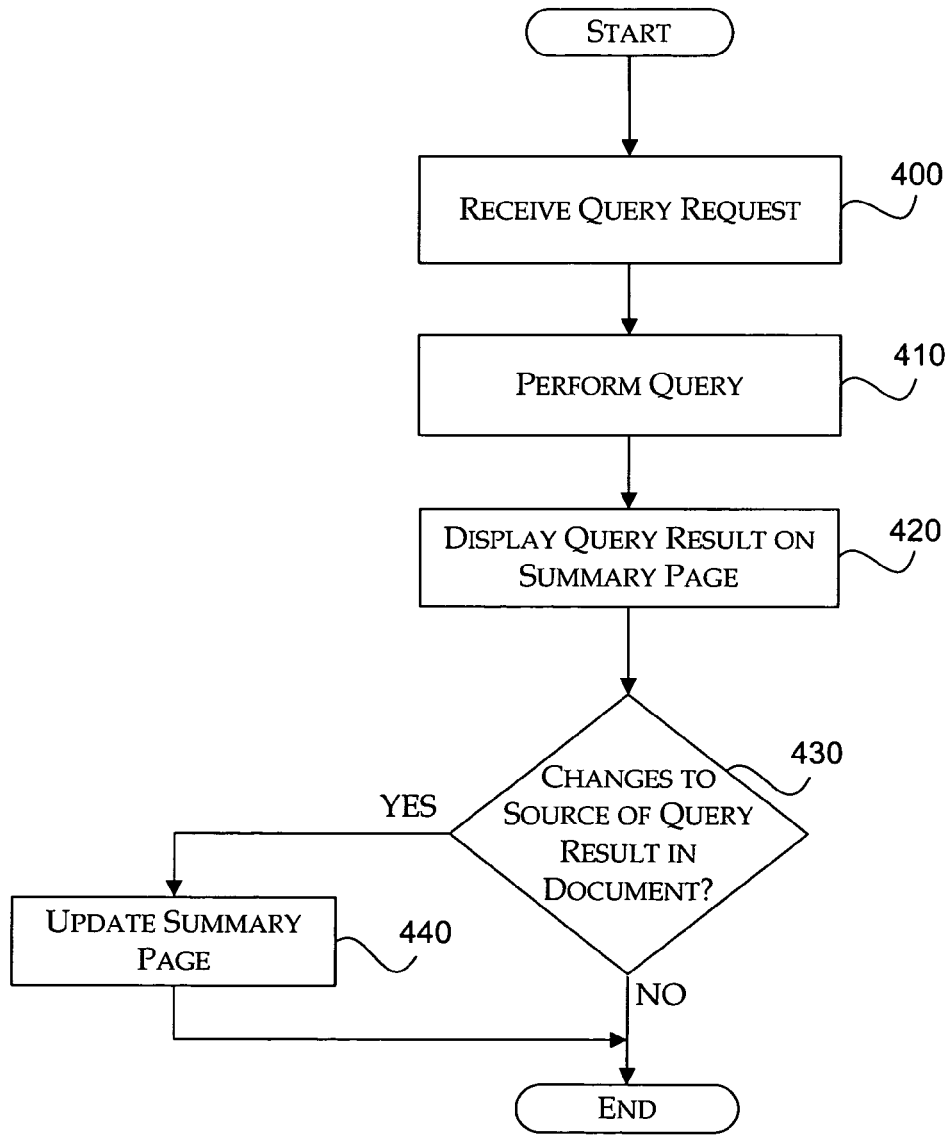
FIG. 4 is an operational flow diagram illustrating a process for updating a summary page associated with a document, in accordance with the present invention.

FIG. 4 is an operational flow diagram illustrating a process for updating a summary page associated with a document. The process begins at a start block where a text document is loaded in memory of a computing device. Different types of data in the document are identified by corresponding metadata. The different types of data that are identified may include a section heading, contact information, an updated object, meeting/class notes, an action item, a hyperlink, customer information, a name, a phone number, an e-mail address, a note flag, or any other indicator of the type of content in the document.

Moving to block 400, a query request is received. The user may create a query or select a query from a pre-defined list. The query identifies the document data to be located and displayed on the summary page. For example, the query may be used to identify data in the document for a table of contents, instances of a character string, a particular type of data (e.g., names, hyperlinks, phone numbers, updated objects, unviewed pages, etc.), an action item list, a particular data pattern, references to a particular data set or a note flag list. The query may be stored in a dynamic content container associated with the document.

Advancing to block 410, the query is performed and the query result is produced. The query may be performed by analyzing metadata associated with the document to locate the data identified in the query. The query result may be stored in a dynamic content container associated with the document.

Transitioning to block 420, the query result is displayed on the summary page. The summary page provides an overview of the document data identified in the query. A user may scan the summary page to determine an overview of the document data included in the query result. The summary page may also include contextual information associated with the query result and links to sources of the query result in the document.

A user may select a link on the summary page and navigate to the location in the document where the corresponding source of the query result appears.

Continuing to decision block 430, a determination is made whether any changes have been made to the sources of the query result in the document. Changes to the sources of the query result may be identified from data in the dynamic content container. Changes to the sources of the query result may be determined upon user action (e.g., selecting an update button), after a predetermined time interval has elapsed (e.g., every thirty seconds), or every time a user navigates to a page that includes a source of the query result. If no changes have been made to the sources of the query result, processing terminates at an end block. If changes have been made to the sources of the query result, processing continues at block 440.

Proceeding to block 440, the summary page is dynamically and continuously updated to reflect any changes made to the sources of the query result in the document. Thus, the summary page is synchronous with a current state of the document. Processing then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for updating a summary page of a text file, comprising:

receiving a request, on a software application of a client, to query a text file for information, wherein the text file is stored in a memory in accordance with the software application of the client, wherein the information is identified by metadata stored with the text file, wherein the software application is at least one member of a group comprising: a word processing application and a notes application;

identifying the information within the text file and storing the information in a dynamic container that is created when the request is received, wherein the dynamic container causes a continuous and synchronous relationship between the text file and the summary page;

displaying the identified information on the summary page, wherein a modification to the query of the text file dynamically modifies the identified information on the summary page, wherein the summary page includes a plurality of links, wherein each link indicates a portion of the text file that is displayed on the summary page, wherein selection of one of the links causes navigation to the portion of the text file that is displayed on the summary page and is indicated by the selected link; and upon receiving a user input that modifies the information of the text file in relation to the identified information of the summary page, automatically updating the dynamic container with the modification to cause the dynamic container to automatically update the summary page with the modification.

2. The computer-implemented method of claim 1, wherein displaying the identified information further comprises displaying at least one of: an action item list that is associated with tasks for the text file, a list of content that was modified prior to the receiving the query a list of users that have modified content in the text file, and a list of references to a particular data set within the content of the text file.

3. The computer-implemented method of claim 1, wherein the information is a specific type of data queried as a result of a pre-defined query list.

4. The computer-implemented method of claim 3, wherein the specific type of data is one of: a section heading, a note flag, an action item, contact information, an updated object, and an unviewed object.

5. The computer-implemented method of claim 1 wherein the metadata is embedded in the text file.

6. The computer-implemented method of claim 1, wherein the query is stored in the dynamic container.

7. A computer-readable storage medium storing computer-executable instructions for updating a summary page of a text file, comprising:
   performing a query to identify data in the text file stored in accordance with a software application of a client device, wherein the data is identified by metadata stored with the text file, wherein the software application is at least one member of a group comprising: a word processing application and a notes application;
   in response to performing the query, generating, on the software application of the client device, a dynamic container for the query, wherein the dynamic container facilitates a synchronous relationship between the text file and the summary page;
   obtaining a result of the query on the software application of the client device, wherein the result includes information within the text file, wherein the result is determined by the query;
   storing the result in the dynamic container;
   displaying the query result on the summary page, wherein modification to the query of the text file results in a new query result being displayed on the summary page, wherein the summary page includes a plurality of links, wherein each link indicates a portion of the text file that is displayed on the summary page, wherein selection of one of the links causes navigation to the portion of the text file that is displayed on the summary page and is indicate by the selected link; and
   upon receiving an input that modifies the data of the text file in relation to one of the categories identified in the summary page, automatically updating the dynamic container with the modification to cause the dynamic container to automatically update the summary page with the modification.

8. The computer-readable storage medium of claim 7, wherein displaying the query results further comprises displaying at least one of: an action item list that is associated with tasks for the text file, a list of content that was modified prior to the receiving the query, a list of users that have modified content in the text tile, and a list of references to a particular data set within the content of the text.

9. The computer-readable storage medium of claim 7, wherein the data is a specific type of data queried as a result of a pre-defined query list.

10. The computer-readable storage medium of claim 9, wherein the specific type of data is one of: a section heading, a note flag, an action item, contact information, an updated object, and an unviewed object.

11. The computer-readable storage medium of claim 7, wherein the metadata is embedded in the text file.

12. The computer-readable storage medium of claim 7, wherein the query is stored in the dynamic container.

13. A system for updating a summary page of a text file, comprising:
   a computer system having a memory, wherein the text file is loaded in the memory in accordance with a software application of a client device, wherein the software application is at least one member of a group comprising: a word processing application and a notes application; and
   a summary page update module loaded in the memory in accordance with the software application of the client device, wherein the summary page update module is arranged to:
      receive a query on the software application of the client device for accessing categories of data of the text file stored in accordance with the software application of the client device;
      identify categories of data in the text file, wherein the categories of data are identified by analyzing metadata stored with the text file, wherein the categories of data are determined by the received query, wherein the identified categories of data are stored in a dynamic content container stored with the text file, wherein the dynamic container causes a continuous synchronous relationship between the text file and the summary page;
      display the identified categories of data on the summary page, wherein modification to the query of the text file results in new identified categories of data being displayed on the summary page, wherein the summary page includes a plurality of links, wherein each link indicates a portion of the text file that is displayed on the summary page, wherein selection of one of the links causes navigation to the portion of the text file that is displayed on the summary page and is indicate by the selected link; and
      upon receiving a user input that modifies the text file in relation to one of the categories identified in the summary page, automatically updating the dynamic container with the modification to cause the dynamic container to automatically update the summary page with the modification.

14. The system of claim 13, wherein the metadata is embedded in the text file.

15. The system of claim 13, wherein the query is stored in the dynamic container.

* * * * *